United States Patent [19]
Vowels

[11] Patent Number: 6,035,796
[45] Date of Patent: Mar. 14, 2000

[54] INTEGRATED HOUSEBOAT-POWERBOAT SYSTEM

[76] Inventor: Phillip P. Vowels, 6008 Old Heady Rd., Louisville, Ky. 40299

[21] Appl. No.: 09/152,957

[22] Filed: Sep. 14, 1998

[51] Int. Cl.⁷ ....................................... B63B 21/56
[52] U.S. Cl. ............................. 114/248; 440/84
[58] Field of Search .................... 114/258, 259, 114/77 A, 77 R, 248; 440/84, 87, 1

[56] References Cited

U.S. PATENT DOCUMENTS

| | | |
|---|---|---|
| 3,347,201 | 10/1967 | Szabo . |
| 3,659,546 | 5/1972 | Miklos . |
| 3,815,541 | 6/1974 | Hansen . |
| 3,858,541 | 1/1975 | Metcalf, Jr. et al. . |
| 4,286,537 | 9/1981 | Hvide ...................................... 114/248 |
| 5,352,138 | 10/1994 | Kanno ......................................... 440/1 |
| 5,453,572 | 9/1995 | Kobayashi et al. ..................... 114/248 |
| 5,476,060 | 12/1995 | Kobayashi ............................... 114/248 |
| 5,605,110 | 2/1997 | Talbot ..................................... 114/248 |
| 5,660,131 | 8/1997 | Gulling et al. .......................... 114/248 |

*Primary Examiner*—Ed Swinehart
*Attorney, Agent, or Firm*—James C. Eaves, Jr.; Greenebaum Doll & McDonald PLLC

[57] ABSTRACT

The present invention relates to houseboats and powerboats. More particularly, this invention is directed to utilize electronic circuitry and controls, in combination with boat docking technology, that will allow a fully functional powerboat to be efficiently and functionally integrated into the stern of a houseboat. The powerboat functions normally as a stand-alone unit. When the powerboat is locked into the houseboat's stern docking station, and electronics connected, it functions as the drive and navigational component for the houseboat.

10 Claims, 6 Drawing Sheets

INTEGRATED HOUSEBOAT-POWERBOAT SYSTEM

BACKGROUND OF THE INVENTION

1. Field of the Invention

The present invention relates to houseboats and powerboats. More particularly, this invention is directed to utilize electronic circuitry and controls, in combination with boat docking technology, that will allow a fully functional powerboat to be efficiently and functionally integrated into the stern of a houseboat. The powerboat will function as a stand-alone unit. When the powerboat is locked into the houseboat's stern docking station, and electronics connected, it will function as the drive and navigational component for the houseboat.

2. Discussion of the Prior Art

Major components that provide the foundation for fresh water recreation are: beaches; shore line accommodations, i.e. hotels, cottages, tents, etc.; docks and lake/river facilities; houseboats; leisure powerboats; fishing powerboats; and an ever increasing number of personal water crafts, i.e. jet skies. In the past there have been various attempts to combine houseboats, house trailers, automobiles, powerboats, and pontoon boats. Typically, these combinations have relied on mechanical control transfers to make the concept work. These mechanical transfers were complicated, bulky, cumbersome, reduced operating efficiency, required considerable maintenance, and prone to breakdowns.

U.S. Pat. No. 5,605,110, to Talbot, teaches a power boat which receives its mechanical power from one or more personal watercraft received in one or more bays in the aft portion of the power boat. Mechanical linkages are used to transfer control of the personal watercraft to the power boat. The throttle grip and the handlebars of the personal watercraft must be operated through this mechanical linkage to maneuver the power boat. U.S. Pat. No. 5,453,572, to Kobayashi et al., and U.S. Pat. No. 5,476,060, to Kobayashi, teach similar docking watercraft, where a small individual watercraft is received in the berthing area of a larger watercraft and used to power the larger watercraft, although operation of the larger watercraft is done from the individual watercraft. U.S. Pat. No. 3,347,201, to Szabo, teaches a boat having a covered compartment open at the aft end to receive one or more auxiliary craft. The auxiliary craft propulsion means may drive either the auxiliary craft on its own or may drive the main boat.

U.S. Pat. No. 3,659,546, to Miklos, teaches a motor boat propelled pontoon boat, where the motor boat is received into a U-shaped pontoon boat at the stern end of the pontoon boat and is used to power the combined pontoon and motor boats. U.S. Pat. No. 3,815,541, to Hansen, teaches a houseboat having a forward opening into which a relatively small power boat is received to provide power for the houseboat. The throttle of the power boat can be controlled from the houseboat using a mechanical linkage. The power boat steering wheel is locked at a fixed position. The power boat throttle setting controls the speed of the houseboat. Direction is controlled by a separate rudder system toward the rear of the houseboat.

SUMMARY OF THE INVENTION

The present invention is for a houseboat and a powerboat, each watercraft being equipped with fully compatible and integrated electronic navigation and steering controls. These electronic controls work in conjunction with a powerboat docking station located in the stern of the houseboat. This system allows a fully functional, self-contained powerboat, to become a functional part of the houseboat. As such, the powerboat provides the power and navigation that would be found in a conventional houseboat.

More particularly, the present invention preferably comprises the use of a welded aluminum powerboat, of a northwest United States design. This design allows this craft to safely and efficiently navigate some of the most aggressive white water rivers in the world. The cornerstone to this powerboat is the reverse chine hull. This utilizes energy available in the bow spray to create lift beneath the hull. This causes the powerboat to plane much faster, reducing draft, and thus creating less drag. Additionally, the reverse chine will not allow the rear of the craft to slide during tight maneuvering. While the powerboat is reinforced with welded aluminum ribs throughout the structure, is outer design has a stylish runabout look. This powerboat is equipped with a single V-6, 190 HP, in board engine. This provides more then enough power for maneuvering a large houseboat, but does not overpower a pleasure powerboat. The outdrive is a Merc Cruiser Bravo II, offering strength and durability. The propeller selected is a stainless steel, three (3) blade, 14-inch diameter, and 19 pitch. This propeller does not reduce the performance of the powerboat, providing quick takeoff power to pull skiers, but at the same time is wholly adequate to power and navigate the houseboat.

The powerboat steering system is managed through electronic controls. The shift/throttle is also managed through another set of electronic controls. As equipped, all powerboat controls, functions, gauges and meters are managed electronically, versus the traditional mechanical controls. All controls for the powerboat are transferred to the houseboat when powerboat is in docked mode via an electronic umbilical cord.

The sturdy aluminum docking station for the powerboat is incorporated into the stern of the houseboat. The docking station design conforms to the exact shape of the powerboat. Special skids project for the bottom and sides of the docking station. These skids first guide the powerboat into position when docking, and then support the powerboat in its fully docked position. The five-sided aluminum positioning cone in the front of the docking station, along with skids, exactly position the powerboat. In the fully docked position, the front docking design offers vertical support for the powerboat. It also provides the main pressure point for forward thrust of the powerboat against the houseboat.

The rear of the powerboat is secured to the rear of the houseboat with retractable, reinforced locking arms. Once these locking arms are secured, the powerboat is rigidly secured to the houseboat. All houseboat/powerboat forward, reverse, and side to side movement are in exact unison.

Both the upper and lower control helms on the houseboat are equipped with similar electronic controls found on the powerboat. These controls are wired into the electronic umbilical cord that runs the length of the boat to the powerboat docking station. Once this umbilical cord is plugged into the powerboat's receiving outlet, described above, full control of the powerboat is transferred to the houseboat control stations. The powerboat's controls are disabled when the umbilical cord is connected to the powerboat. When the other end of the umbilical cord is connected to the houseboat, transfer of control to the houseboat is made. Only one control station on the houseboat is operational at any one time. Full control can however be transferred back and forth between the upper and lower houseboat control stations as desired.

This invention provides many benefits. The invention provides the first ever, fully integrated, combination powerboat and houseboat design. Offering efficient, user friendly, and affordable, access to the best in water recreation that a powerboat and houseboat can offer and the luxury of a houseboat and the fun, freedom and flexibility of a powerboat.

With one in-board engine powering both the powerboat and houseboat, there are fewer engines, less and easier maintenance, less pollution, and less expense. Propulsion fuel need not be stored on the houseboat. Having the flexibility of a powerboat, and not having the hassle of docking a large houseboat, means more visits to marinas for fuel and supplies. Both the houseboat and powerboat fit conveniently into one docking space. The powerboat can be easily disengaged and used at anytime from the main dock. In the case of rentals, this would allow the rental of the powerboat only, if business demanded such. Also with rentals, if mechanical trouble develops, the marina need only replace the problem powerboat with another unit. The problem powerboat can then be easily taken to a mechanics station for repairs.

Finally, the present invention comprises a combined houseboat and powerboat system, including: a docking station in a stern portion of the houseboat to receive the powerboat; a houseboat transfer unit on the houseboat; a powerboat transfer unit on the powerboat; and a removable connection between the powerboat and the houseboat to interconnect the powerboat transfer unit and the houseboat transfer unit; so that when the connection does not interconnect to the powerboat, the powerboat is in a fully operational condition and the houseboat transfer unit does not permit any operational control of the powerboat from the houseboat; and, when the connection does interconnect to the powerboat, the powerboat transfer unit does not permit any operational control of the powerboat from the powerboat, and when the connection does interconnect the powerboat transfer unit and the houseboat transfer unit, the houseboat transfer unit may permit operational control of the powerboat from the houseboat.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

The present invention comprises a system whereby a powerboat can propel and control a houseboat via electronics (Sail-By-Wire). When it is desired to move the houseboat, the powerboat is driven into a docking station located in the stern of the houseboat and mechanically attached to the houseboat. At this point, ignition, starting, steering, throttle and shift controls of the powerbcat are transferred to the houseboat. When in the joined mode, the houseboat operates exactly as one that has its own propulsion plant.

I. OPERATION DESCRIPTION OF ELECTRONICS

Figure 1:
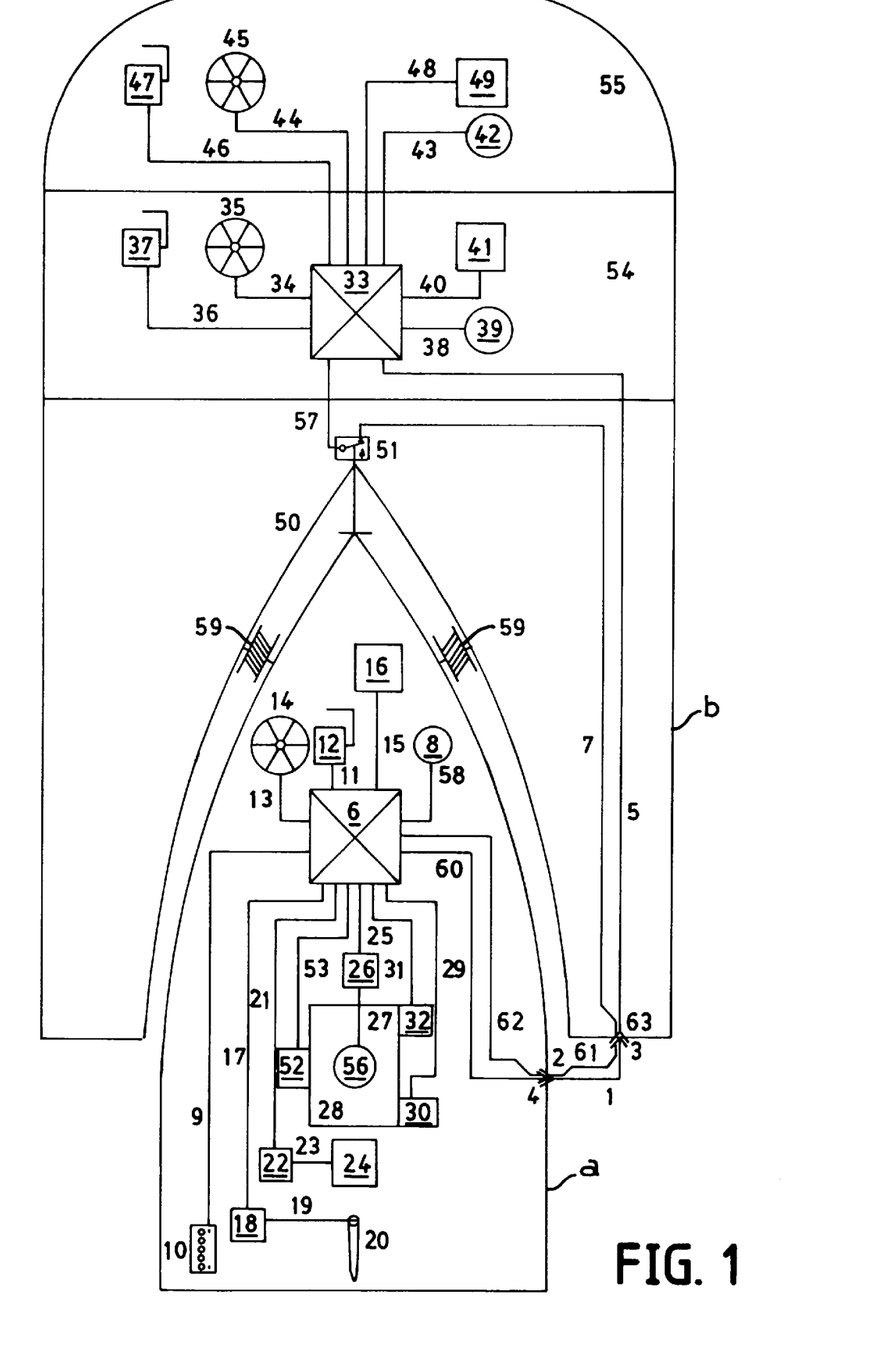
FIG. 1 is a diagram of the electronic circuitry that converts both the houseboat and the powerboat to all electronic systems and integrates both crafts' electronic systems.

A. POWERBOAT AS A STAND-ALONE UNIT:

With reference to FIG. 1, when powerboat (a) is being used as a stand-alone watercraft (not docked to houseboat (b) and electrical umbilical cord (1) is disconnected, the powerboat's integrated transfer unit (6) directs all powerboat functions to powerboat helm. The transfer unit (6) connects powerboat's ignition/start switch (8) to engine ignition system (32) via wire connector (58) and wire connector (31). The transfer unit (6) connects powerboat's ignition start switch (8) to engine starter (30) via wire (58) and wire connector (29). The transfer unit (6) connects the Morse MPS electronic steering helm (14) to the powerboats rudder (20) via wire connector (13), Morse steering helm to power unit harness (17), Morse actuator/drive unit (18), and Morse mechanical rotary cable and steering ram assembly (19). The Morse actuator/drive unit (18) is securely mounted in the rear of the powerboat, near the engine. The Morse mechanical rotary cable and steering ram assembly (19) is designed to mount easily and securely to all Merc Cruiser inboard engines. The transfer unit (6) connects the Morse KE-4 combination throttle and shift hand control (12) to the Merc Cruiser inboard engine's throttle control (56) via wire connector (11), wire connector (25), Morse throttle actuator (26), and a mechanical push/pull cable (27). The transfer unit connects the Morse KE-4 combination throttle and shift hand control (12) to the Merc Cruiser inboard engine's transmission shift control (24) via wire connector (11), wire connector (21), Morse shifter actuator (22), and a mechanical push/pull cable (23). The transfer unit makes all the above mentioned connections on the powerboat when ignition/start switch (8) is turned on, supplying current from battery (10) via wire connector (9) to all circuits. In addition, the transfer unit connects the engine monitoring sensors for gauges (52) (tachometer, oil pressure, fuel, and temperature) to the powerboat's helm instruments (16) via wire connectors (53) and (15). Specifically, when undocked, the powerboat (a) operates just like any other runabout, but with enhanced ease of operation and durability resulting from the use of all electronic controls.

B. POWERBOAT IN DOCKED MODE WITH HOUSEBOAT:

The powerboat (a) is moved into position in the docking station and locked into position via mechanical means, a detailed description of which follows under OPERATION DESCRIPTION OF THE HOUSEBOAT DOCKING STATION. With reference to FIG. 1, powerboat (a) is designed to fit into docking station (50) in houseboat (b) and securely locked into position using mechanical connecting means (59). Powerboat (a) is then electronically connected to houseboat (b) through an electrical umbilical cord connecting means (1). All electrical connections between the powerboat (a) and the houseboat (b) are made through this durable, waterproof, electrical umbilical cord (1). This electrical umbilical cord is made up of 36 numerically labeled, 18 gauge, wires. The electrical umbilical cord (1) has a 36 male lead insert plug (2). The plug connector (2) can he plugged into a 36 lead female receiving outlet (4) mounted on the control panel of the powerboat. The insert plug (2) and receiving outlet (4) are designed with guiding tongues and groves that insure an exact and secure connection every time. Once the electrical umbilical cord (1) is plugged into houseboat at receiving outlet (4) via connector (2) and conductor (60) the powerboats integrated transfer unit (6) the powerboat integrated transfer unit senses this occurrence by the following means. Upon connection of the umbilical cord (1) to the powerboat (a), connection is made between battery (10) and (6) via (9), one conductor within (60), (4), (2), one conductor within (1) which is jumpered within the houseboat end of the electrical umbilical cord connector (3) to (61), another conductor within (1). This other conductor within (1) then continues back to (6) through (2), (4) and another conductor (62) in (60). This DC voltage triggers relays by which the transfer unit (6) immediately disconnects the entire powerboat's steering and navigation controls and all gauges used when the powerboat is in the stand-alone mode, namely (8), (12), (14), and (16).

Houseboat transfer unit (33) is provided a DC voltage from powerboat battery (10) through (9), (6), (60), connector (4), connector (2), umbilical cord (1) umbilical cable houseboat connector (3), houseboat umbilical connector (63) via conductor (7) through docking safety limit switch (51) and conductor (57). The transfer unit (6) then routes all powerboat functions described above under POWERBOAT AS A STAND ALONE UNIT to the houseboat transfer unit (33), via (60), connectors (4)(2), umbilical cord (1), connectors (3)(63) and (5). The houseboat transfer unit (33) then interfaces with powerboat transfer unit (6) to allow the houseboat's lower helm (54) operation and navigation controls and all related gauges to function in identical fashion as the ones on the powerboat when the powerboat was in the stand alone mode, those being ignition/starter switch (39) interfaced to engine ignition system (32) and engine starter (30), Morse electronic steering helm (35) interfaced to powerboat rudder (20), Morse throttle shift hand control (37) interfaced to engine throttle control (56) and engine transmission shift control (24), and helm instruments (41) interfaced to engine monitoring sensors (52), the interfaces as explained above.

The houseboat transfer unit (33) has the additional ability to transfer all operation and navigation controls and all powerboat related gauges from the houseboats lower helm (54) to the houseboat's upper helm (55), via wire connectors (43), (44), (46), (48). The houseboat's upper helm (55) operation and navigation controls and all related gauges to function in identical fashion as the ones on the lower helm (54) and on the powerboat in the stand alone mode, those being ignition/starter switch (42) interfaced to engine ignition system (32) and engine starter (30), Morse electronic steering helm (45) interfaced to powerboat rudder (20), Morse throttle shift hand control (47) interfaced to engine throttle control (56) and engine transmission shift control (24), and helm instruments (49) interfaced to engine monitoring sensors (52), the interfaces as explained above. Interlock devices in the houseboat transfer unit (33) allow only one of the houseboat helms to be fully functional at any one time.

Transfer of control between (54) and (55) is accomplished via logic means initiated by energizing (39) or (42) and synchronizing Morse electronic steering helms (35) and (45). For example, if houseboat (b) is being controlled from the lower helm position (54) and it is wished to transfer control to the upper helm position (55), the operator moves Morse throttle shift hand control (37) to the neutral/idle position then proceeds to the upper helm position (55). Once at (55), the operator turns on ignition (42), being careful to not engage starter (30) because engine (28) is already running. To accomplish steering transfer, the operator steers Morse electronic steering helm (45) left or right until its position matches that of Morse electronic steering helm (35) in the lower position. At the point the two helms match, steering control is transferred to the upper helm (55). This will be indicated by the energization of all gauges on (49) and de-energization of all gauges on (41). To accomplish throttle/shift (47) transfer, the operator moves the Morse throttle shift hand control (37) to the neutral/idle position place and presses the Morse transfer button on (37). At this point, gear may be engaged and throttle advanced. Houseboat (b) is now in control from (55).

If it is wished to return control of the boat to the lower helm (54) from the upper helm (55), the operator moves Morse throttle shift hand control (47) to the neutral/idle position then proceeds to the lower helm position (54). Since the ignition switch at the lower helm position was left on, the operator quickly cycles the key from "on" to "off" and back to "on". A short delay in the ignition switching logic will allow this without stopping the engine. The operator now steers Morse electronic steering helm (35) left or right until its position matches that of Morse electronic steering helm (45) in the upper position. At the point the two helms match, steering control is transferred to the lower helm (54). This will be indicated by the energization of all gauges on (41) and de-energization of all gauges on (49). To accomplish throttle/shift (37) transfer, the operator moves the Morse throttle shift hand control (47) to the neutral/idle position place and presses the Morse transfer button on (47). At this point, gear may be engaged and throttle advanced. Houseboat (b) is now in control from the lower helm position (54).

If it is wished to stop the engine, this can be accomplished by turning off the ignition switch (39) or (42) in the active helm (54) or (55). The ignition switch on the inactive helm may remain on.

To restart the boat from the active helm (54) or (55), all that is needed to do is to turn on ignition (39) or (42) from the active helm and rotate the key to the "start" position. To restart the boat from the inactive helm, cycle or turn on the ignition switch (39) or (42) in the helm from which control is wished. Swing the wheel as in a running transfer of control until the gauges become active. Start the engine. Transfer throttle/shift control as in a running transfer. The boat is now in complete control from the selected helm position.

II. OPERATION DESCRIPTION OF THE HOUSEBOAT DOCKING STATION

Figure 2:
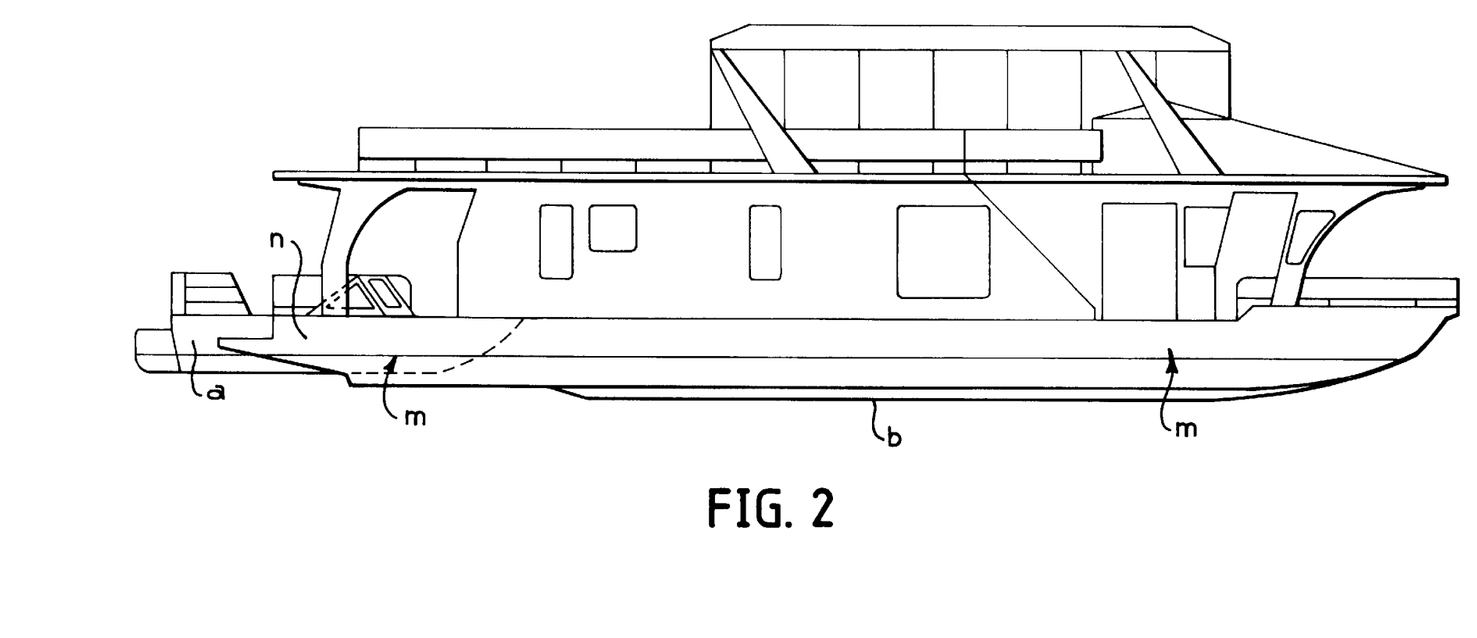
FIG. 2 demonstrates from the side of the boats the relationship of the combined houseboat and powerboat.

FIG. 2 shows the powerboat (a) docked into the houseboat's docking station (n). This drawing indicates the waterline (m) on both the powerboat (a) and houseboat (b) as would occur under normal load and operating conditions. Powerboat (a) extends just beyond the rear of houseboat (b). This offers superior maneuverability compared to a propulsion unit located in front of the rear of the houseboat. The houseboat's docking station (n) is designed to give enough support to the powerboat, but not take up any more of the houseboat living space then necessary.

Figure 3:
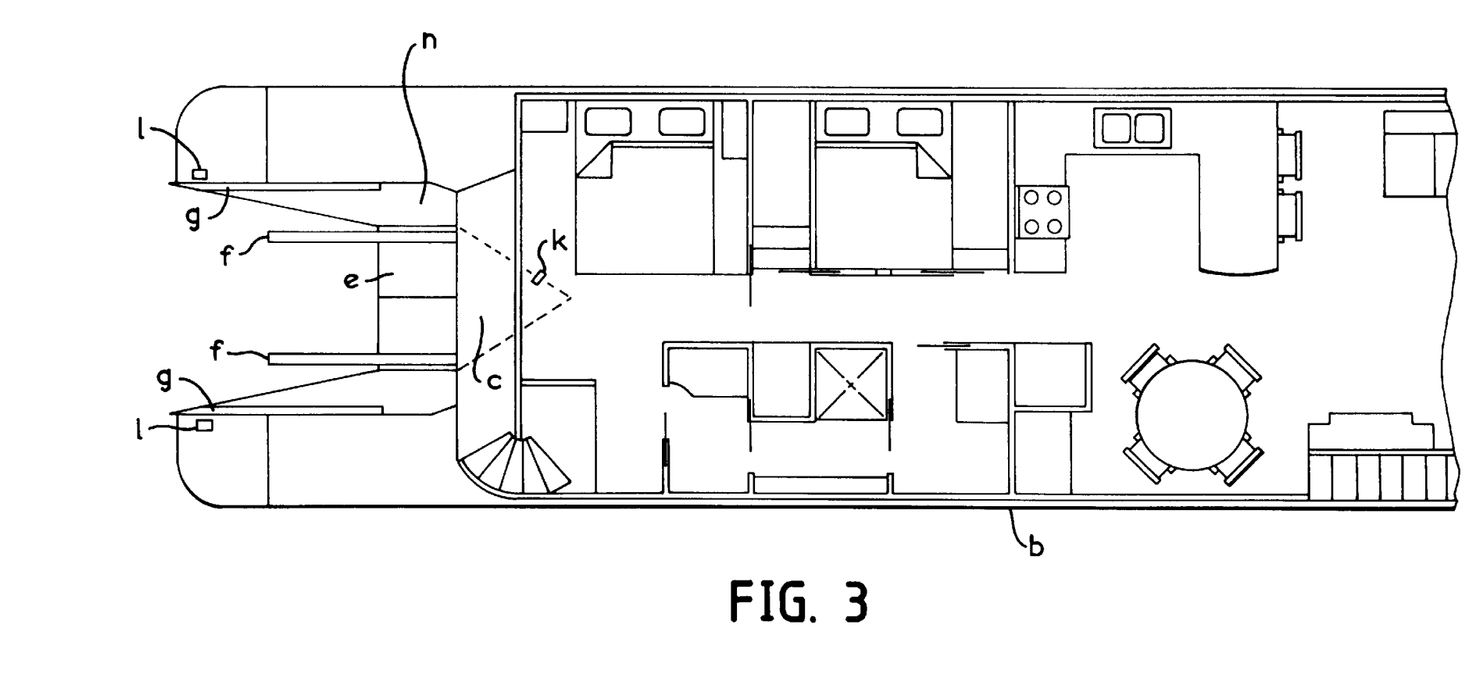
FIG. 3 is a top view of the rear portion of the houseboat showing the powerboat docking station, the top portion of the houseboat having been removed for clarity.

FIG. 3 is a depiction of the overall houseboat docking station (n). The docking station (n) for the powerboat is located in the stern of the houseboat (b). It is symmetrically centered along the centerline running the length of the houseboat. The overall docking station conforms to the contours of the powerboat. The basic components of the docking station are the 5 sided aluminum positioning cone (c); the bottom reinforced support platform (e); the two bottom guide/vertical support skids (f); the two side guide/horizontal support skids (g); and the final positioning/locking arms [depicted and described in FIG. 5—Items (h) & (j)]. The combined interaction of these components allows the powerboat to easily be docked into the houseboat, and makes the powerboat a virtual part of the houseboat once docked.

Figure 4:
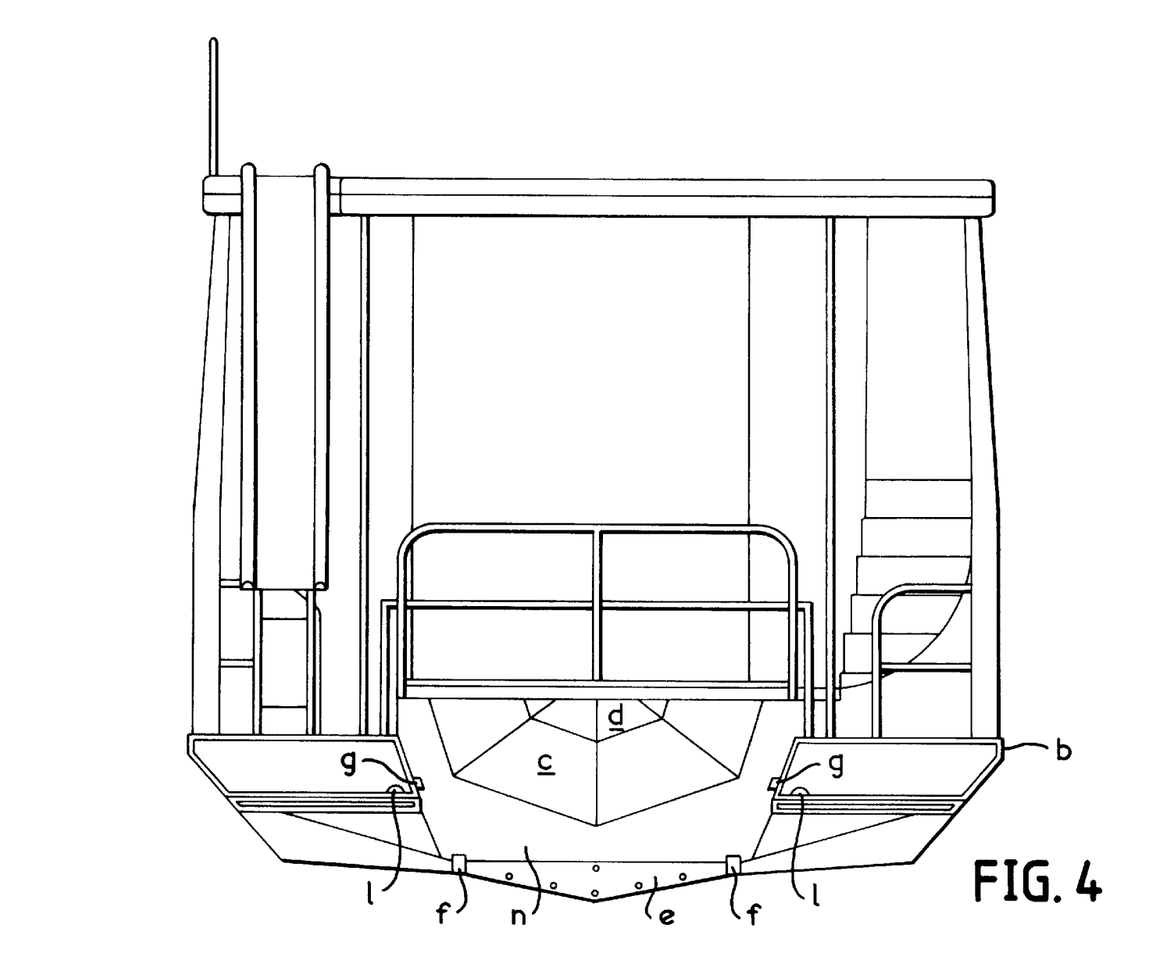
FIG. 4 is a rear view of the houseboat showing the powerboat docking station.

More specifically, the five-sided positioning cone (c) is made from 3/16 inch thick welded aluminum. It is positioned within the main structure of the houseboat so as to give maximum integrated strength to the overall houseboat. FIG. 4 shows four of the sides of the cone, with the fifth side being the top flat side which is connected to the underside of the houseboat. Naturally, this cone structure can be changed to accommodate different powerboat shapes. This positioning cone provides a solid, balanced structure for absorbing the forward thrust of the powerboat. Located in the nose of this positing cone are high-density polyethylene skid pads [described and depicted in FIG. 4 Item (d)]. These skid pads, in combination with the one mounted on the very top front of the powerboat [described and depicted in FIG. 5—Item (o)], forces the powerboat to easily assume an exact, tight position within positioning cone (c). In this exact and tight position, the positioning cone provides support for the powerboat vertically, both up and down. It also provides horizontal support, right and left. The positioning cone's exact support insures consistent and precise absorption of forward thrust from the powerboat. The bottom, reinforced support platform (e) provides strength within the docking station, compensating for an opening within the stern of the houseboat structure to dock a powerboat. This platform is constructed of 3/16 inch thick aluminum ribs welded to a solid aluminum bottom plate. This support platform is welded solidly into the houseboat's main structure. The bottom guide/vertical support skids (f) project out three feet for the bottom support platform (e). The skids are constructed from ¼ inch aluminum, welded into a tight rectangular form. This gives the skids great strength. High-density polyethylene pads are attached to the top of the skids. The skids initially guide the powerboat into position within the docking station. As the powerboat moves forward the skids lift the powerboat approximately one inch from its normal floating position. The powerboat continues to receive buoyancy support from the water, but now has support from the bottom support skids as well. As the boat moves into the positioning cone (c), the bottom skids (f) have positioned the front of the powerboat to just the right height to enter the cone. The two side guide/horizontal support skids (g) are four feet long on each side of the docking station. High-density polyethylene pads have been attached to the outer surfaces. These skids initially center the powerboat within the docking station. As the powerboat moves forward these horizontal skids eliminates the powerboats ability to move from side to side.

FIG. 4 shows the houseboat's docking station (n) from the viewpoint of the powerbcat operator driving the powerboat in the docking station. The powerboat will first come in contact with the side guide/horizontal support skids (g). These will begin centering the powerboat. Next contact will be made with the bottom guide/vertical support skids (f). These will further position the powerboat and apply upper lift. Next, the powerboat will move into the five-sided positioning cone (c). As the powerboat moves to the very front of the positioning cone, it will come in contact with the high density polyethylene pads (d) that line the far back section of the four bottom sides of the positioning cone. A high-density polyethylene pad is attached to the top front of the powerboat (o) (shown in FIG. 5), and this pad slides against the upper side of the positioning cone.

Figure 5:
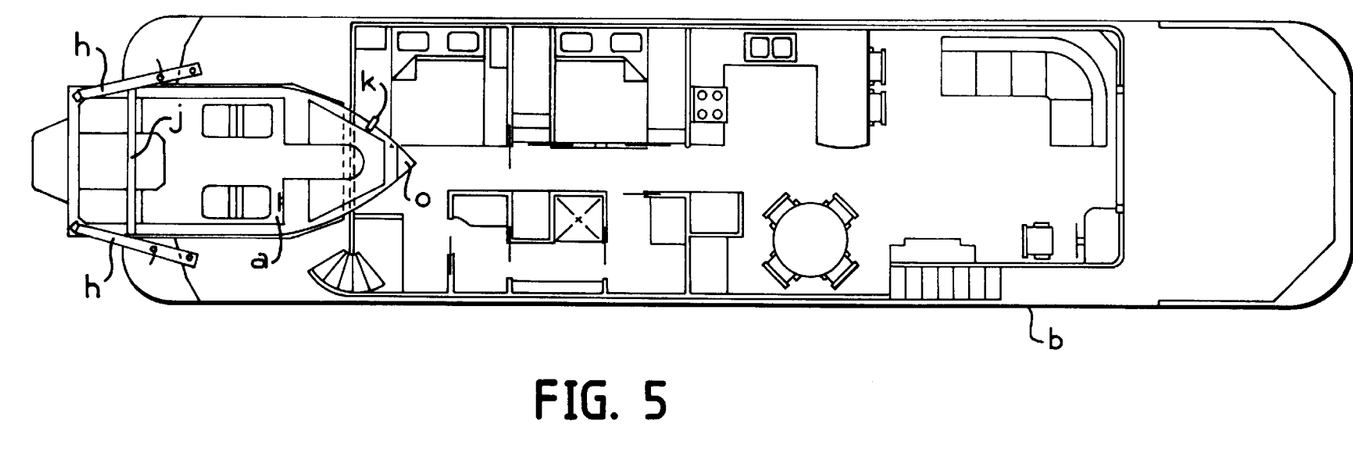
FIG. 5 is a top view representation of the houseboat, with top portion removed, having the powerboat docked in the docking station.

FIG. 5 shows the powerboat (a) in a fully docked positioned within houseboat (b). When the powerboat is driven into the docking station and reaches a fairly snug position, via the docking components described above, the two positioning/locking arms (h) are attached to the powerboat. Each of these locking arms has a 3000 pound working strength. Each is equipped with a hand ratchet allowing easy expansion or retraction. These locking arms are bolted to the right and left corners of the houseboat. Each has its own compartment for storage. On the other end of the locking arms is a solid U-shaped metal hook plate. This hook plate allows each of the locking arms to be securely attached to each rear corner of the powerboat. Once both docking arms are attached to the powerboat, they are ratcheted tight, placing the powerboat into its final docked position.

A safety strap (j) is then placed across the back section of the powerboat, hooked to each side of the docking station and ratcheted tight. As shown in FIGS. 3 and 4, safety strap (j) is to be hooked to a pair of eyelets (1), the eyelets being attached on opposed lower stern platforms. With this safety strap in place, the powerboat has now been fully secured and becomes a virtual part of the houseboat.

A limit switch (k) extends from the front of the docking station. This limit switch is a safety switch, the electronics of which were explained above in the discussion of docking safety limit switch (51) under the powerboat in docked mode electronics section. Limit switch (k) or (51) must be activated by pressure from the front of the powerboat, while in the fully docked positioned, before any of the electronic control transfer to houseboat transfer unit (33) can take place. If limit switch (k) is deactivated (powerboat pulls away from switch) while operating houseboat, the powerboat will shut down and all controls will be deactivated.

Figure 6:
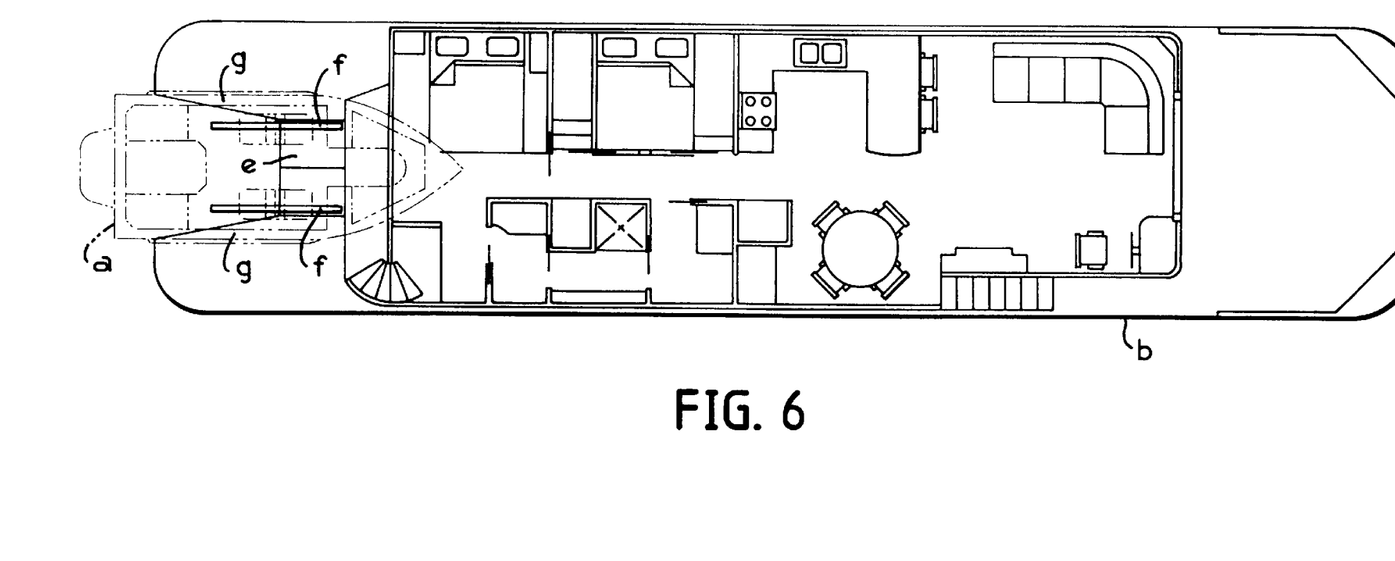
FIG. 6 is a top view of the houseboat, with top portion removed, having the powerboat docked in the docking station, further showing how the docking station support skids support the powerboat.

FIG. 6, with the powerboat in phantom lines, demonstrates the positioning of support skids (f) & (g) as they would come in contact with the powerboat in the fully docked position.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed:

1. A combined houseboat and powerboat system, comprising:

a. a docking station in a stern portion of the houseboat to receive the powerboat;

b. a houseboat transfer unit on the houseboat;

c. a powerboat transfer unit on the powerboat;

d. and a removable connection between said powerboat and said houseboat to interconnect said powerboat transfer unit and said houseboat transfer unit;

e. so that when said connection does not interconnect to said powerboat, said powerboat is in a fully operational condition and said houseboat transfer unit does not permit any operational control of said powerboat from said houseboat; and, when said connection does interconnect to said powerboat, said powerboat transfer unit does not permit any operational control of said powerboat from said powerboat, and when said connection does interconnect said powerboat transfer unit and said houseboat transfer unit, said houseboat transfer unit may permit operational control of said powerboat from said houseboat.

2. The combined houseboat and powerboat system of claim 1, where said connection includes an umbilical cord.

3. The combined houseboat and powerboat system of claim 1, where said houseboat includes an upper helm and a lower helm and where, when said houseboat transfer unit may permit operational control of said powerboat from said houseboat, said houseboat transfer unit operational control permits said operational control from either said upper helm or said lower helm.

4. The combined houseboat and powerboat system of claim 1 where said docking station includes a limit switch, said limit switch being activated by a securing of said powerboat within said docking station, where said limit switch must be activated before said houseboat transfer unit may permit operational control of said powerboat from said houseboat.

5. The combined houseboat and powerboat system of claim 1 where said docking station includes a positioning cone, said positioning cone receiving a bow of said powerboat, said positioning cone and said powerboat bow having a substantially similar shape.

6. The combined houseboat and powerboat system of claim 5 where said docking station includes a plurality of support skids to engage a hull of said powerboat.

7. The combined houseboat and powerboat system of claim 6 where said docking station includes a pair of locking arms, each of said locking arms connecting from one side of said houseboat stern to a corresponding side of a powerboat stern.

8. The combined houseboat and powerboat system of claim 5 where said positioning cone includes a plurality of skid pads to interface between the powerboat bow and the positioning cone.

9. The combined houseboat and powerboat system of claim 7 where said docking station includes a pair of hooks, each of said hooks connected to a side of said docking station, the docking station further including a safety strap, said safety strap passing across said powerboat and connected to said pair of hooks.

10. The combined houseboat and powerboat system of claim 7 where said docking station includes a limit switch, said limit switch being activated by a securing of said powerboat within said docking station, where said limit switch must be activated before said houseboat transfer unit may permit operational control of said powerboat from said houseboat.

* * * * *